Jan. 14, 1947.  R. SARDESON  2,414,396
FOOD COOKING DEVICE
Filed April 17, 1942  3 Sheets-Sheet 1

Inventor
Robert Sardeson
By Caswell & Lagaard
Attorneys

Jan. 14, 1947. R. SARDESON 2,414,396
FOOD COOKING DEVICE
Filed April 17, 1942 3 Sheets—Sheet 3

Inventor
Robert Sardeson
By Caswell & Lagaard
Attorneys

Patented Jan. 14, 1947

2,414,396

UNITED STATES PATENT OFFICE 2,414,396

FOOD COOKING DEVICE

Robert Sardeson, Minneapolis, Minn., assignor to Harold C. Genter, Minneapolis, Minn.

Application April 17, 1942, Serial No. 439,346

8 Claims. (Cl. 219—19)

1

My invention relates to cooking devices and particularly to electrically operated bread toasters.

An object of the invention resides in providing a cooking device adapted to be automatically compensated for variations of the voltage of the electric current used for operating the same.

Another object of the invention resides in providing a periodically operable cooking device having a timing mechanism for terminating the cooking operation and including a thermally responsive member and an electrical heater therefor and in further providing means dependent upon variations in voltage of the source of current for varying the period of the timing mechanism.

An object of the invention resides in providing a food cooking device including a resistor having a high temperature coefficient of resistance adapted to be energized by the same source of electric current as the food cooking device and operating to vary the timing period of the cooking device.

A feature of the invention resides in providing a main heating circuit having the heating means therein and in connecting the thermally variable resistor in the main circuit in series with the heating means.

A still further object of the invention resides in connecting the heating means, heater and resistor in series in the main heating circuit.

Another object of the invention resides in providing a by-pass circuit with a resistance having a low temperature coefficient of resistance shunting said resistor.

An object of the invention resides in providing a food cooking device in which the cooking continues without interruption until the cooking operation is completed.

A still further object of the invention resides in providing a cooking device in which the heating means and resistor are continuously energized during the cooking period.

Other objects of the invention reside in the novel combination and arrangement of parts and in the details of construction hereinafter illustrated and/or described.

2

Fig. 4 is a fragmentary inverted view of the invention with parts removed.

Figure 5:
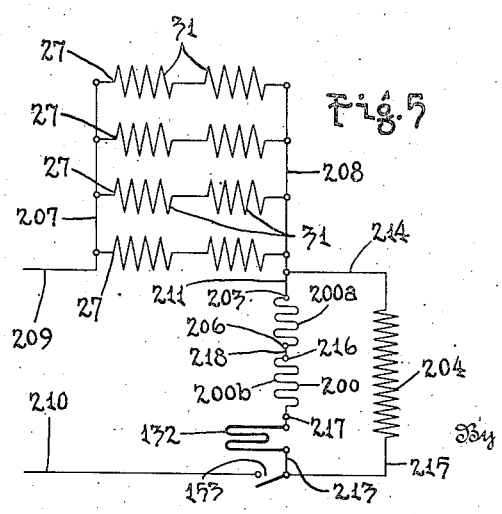

Fig. 5 is a wiring diagram of the invention.

In the use of electrically operated toasters, it has been found in certain types of toasters that, when the voltage drops, the color of the toast produced becomes considerably darker, and when the voltage rises, the toast becomes too light in color. The present invention provides a construction in which uniform results are produced regardless of the voltage of the electric current.

For the purpose of illustrating my invention, I have shown in the drawings at A a bread toaster such as illustrated in my co-pending application for patent Serial No. 289,905, filed August 12, 1939. This toaster has the inherent characteristic that, when the voltage drops, the color of the toast becomes darker. This toaster will now be described in detail.

Figure 1:
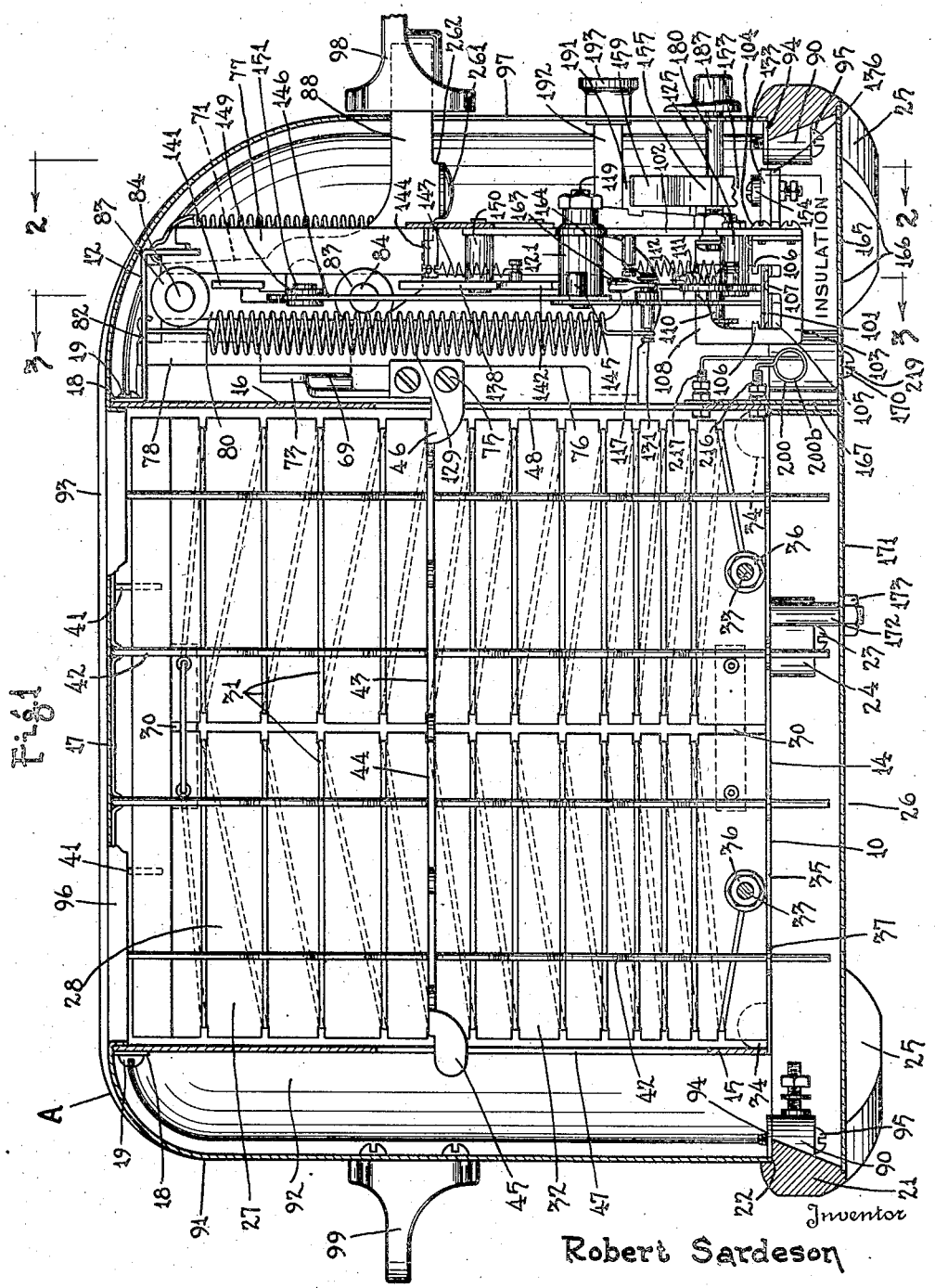
Fig. 1 is an elevational sectional view of a bread toaster illustrating an embodiment of my invention.

The toaster A consists of a frame 10, best shown in Fig. 1. This frame carries within itself a toaster 11, and exteriorly thereof a timing mechanism 12 for controlling the timed operation of the toaster. In conjunction therewith compensating means, indicated in its entirety by the reference numeral 13 is employed which serves to control the operation of the toaster to procure uniform toasting under varying voltage of the source of electrical energy.

The frame 10 consists of a lower horizontal frame member 14 constructed from sheet metal and two vertical end frame members 15 and 16 extending upwardly from the frame member 14. The frame further includes an upper horizontal frame member 17 which connects the two frame members 15 and 16 together at their upper ends. The upper frame member 17 is provided with downwardly turned flanges 18 which are secured to the end frame members 15 and 16 by means of bolts 19.

The frame is supported on a base 21, best shown in Fig. 1, which is constructed from a suitable molded material and extends about the outer confines of the toaster, being open at the center. This base is constructed with a circumferentially extending rabbet 22 therein in which portions of the toaster frame member 14 rest. The frame 10 is held attached to the base 21 by means of screws 23 which are threaded in the frame member 14 and pass through ears 24 formed on the base 21. The base 21 is constructed with feet 25 which raise the base above the surface on which the toaster rests and provides spaces 26 therebetween for the admission of air into the toaster proper.

The toaster 11 is constructed in the following manner: Disposed between the two upper and lower frame members 14 and 17 are four heating elements 27 which are arranged in spaced relation to provide two bread ovens or toasting chambers 28 and 29 therebetween. Each of these heating elements is constructed from two sets of a suitable heat resisting insulating material 32 on which are wound coils 31 constructed of resistance wire or ribbon. The two sheets of insulating material 32 of each heating element are connected together by means of connectors 30 which overlie the same and are riveted thereto. The heating elements 27 are secured together through threaded spindles 33 which pass through the various sheets of insulating material 32. Nuts 36 threaded upon the spindles support the sheets of insulating material in spaced relation to form the toasting chambers 28 and 29. The various heating elements 27 rest directly upon the lower frame member 14 of frame 10 and are held in position thereon by means of lugs 34 which are struck up from the lower frame member 14.

The frame member 14 is formed with openings 35 therein which are so constructed as to provide lugs 37 extending inwardly into the same. The upper frame member 17 is similarly constructed and is formed with two longitudinally extending openings 38. At the marginal portions of the frame member 17, the same is formed with downwardly turned flanges 39 which engage the outermost of the heating elements 27. Lugs 41, struck out of the frame member 17, further engage the heating elements and hold said heating elements in proper position at their upper ends.

The bread ovens 28 and 29 are provided with a number of guard wires 42 which extend through the upper frame member 17 and through the lugs 37 of the lower frame member 14. These wire guards hold the bread in proper position centralized between the pairs of heating elements 27 for each bread oven.

Disposed within each bread oven 28 and 29 and movable between the sets of guard wires 42 is a bread rack 43. This bread rack consists of a bar 44 of sheet metal which is constructed at the ends thereof with ears 45 and 46 which are bent at right angles to the same and which project through vertical slots 47 and 48 formed in the end frame members 15 and 16.

Figure 2:
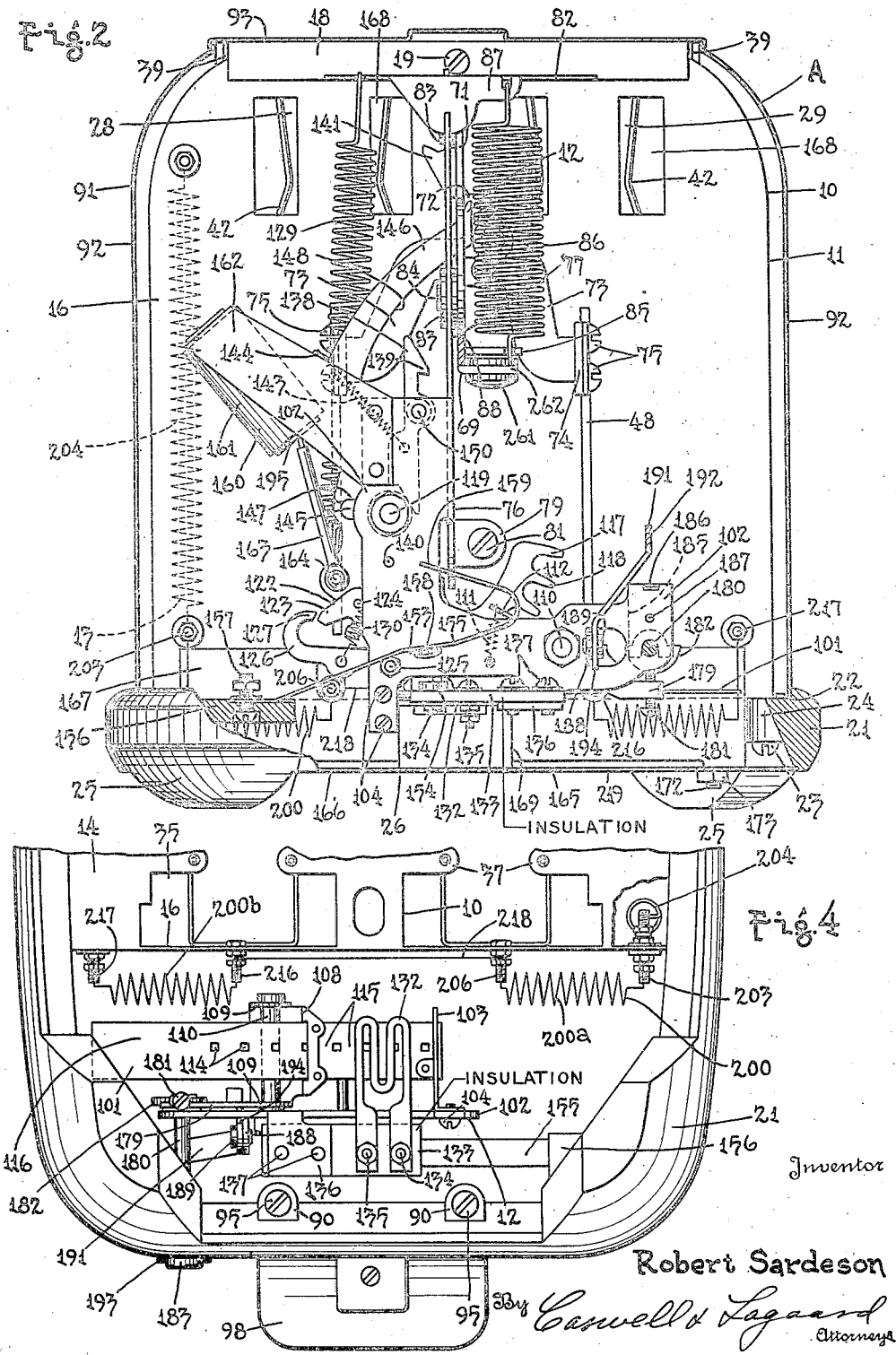
Fig. 2 is an elevational sectional view taken on line 2—2 of Fig. 1.
Figure 3:
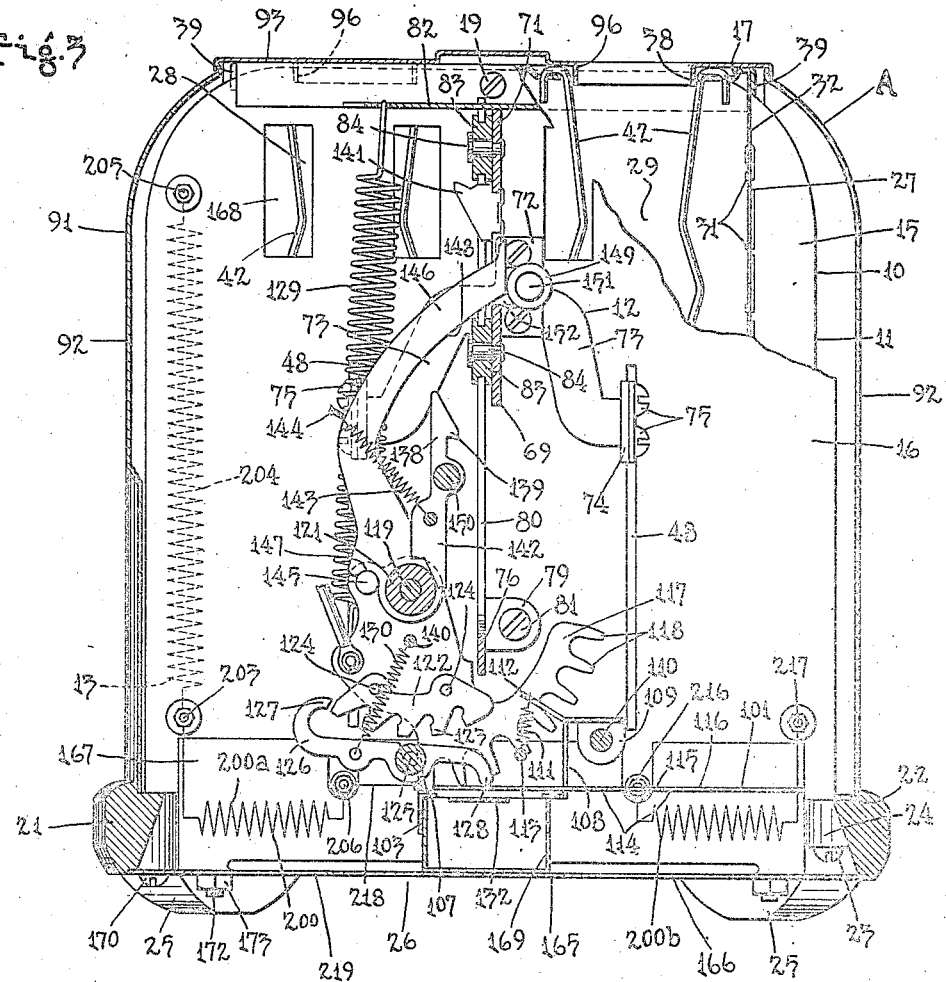
Fig. 3 is a view similar to Fig. 2 taken on line 3—3 of Fig. 1.

The bread racks 43 are supported by a carriage 69, best shown in Figs. 2 and 3. This carriage consists of a plate 71 having a flange 72 turned outwardly therefrom. Attached to this flange are two arms 73 formed with lugs 74 bent outwardly therefrom and parallel with the slots 47 and 48. The ears 46 of the bread racks 43 project beyond the end frame member 16 and are secured to the lugs 74 by means of screws 75. In this manner, the two bread racks are supported on the carriage 69 and are adapted to move vertically along the slots 47 and 48 through guidance of said carriage.

The carriage 69 is guided for vertical movement in the following manner: Attached to the end frame member 16 of frame 10 is a support 76. This support is constructed from sheet metal and is formed to provide two spaced uprights 77 and 78. These uprights are spaced to provide a slot 80 therebetween extending throughout said support. The lowermost portion of the support 76 is formed with an attaching lug 79 which is bent outwardly therefrom and which is attached to the end frame member 16 by means of a screw 81. The upper ends of the uprights 77 and 78 extend through and are attached to a bracket 82 which projects outwardly from and is integral with the flange 18 of the upper frame member 17. This bracket is apertured to receive the ends of said uprights and hold the same in proper relation to one another and to the frame 10. The carriage 69 is provided with two grooved rollers 83 which engage the edges of the uprights 77 and 78 at the slot 80 and which are pivoted on pintles 84 attached to said carriage. By means of this construction, the carriage is guided for vertical movement and the two bread racks 43 are supported and correspondingly guided for movement within the bread ovens 28 and 29.

The carriage 69, as best shown in Fig. 2, has a lug 85 projecting outwardly therefrom. One end of a tension coil spring 86 is hooked on the lug 85 and the other end of said spring is hooked on another lug 87 formed on the bracket 82. This spring provides the energy for raising the carriage 69 and the two bread racks 43 when the toasting operation is completed, and also provides energy for actuating the timing mechanism 12, as will be presently more fully described.

The entire toaster 11 and the timing mechanism 12 are enclosed by means of a case 91. This case has lateral walls 92 and a top 93 connected therewith and is open at the bottom. The lower ends of the lateral walls 92 rest in the rabbet 22 of the base 21. Issuing inwardly from the end walls of said case are ears 94 which are threaded to receive screws 95. These screws pass through ears 98 which are formed on the base 21 and underlie the ears 94. The top 93 of case 91 is constructed with two longitudinally extending openings 96 which are directly disposed above the bread ovens 28 and 29 and which guide slices of bread into the bread ovens between sets of guard wires 42.

In initiating operation of the toaster, the carriage 69 is moved to its lowermost position by means of an arm 88, best shown in Fig. 1. This arm projects outwardly through a slot 97 in the end wall of case 91 and has attached to its outer end a finger piece 98 by means of which the said arm may be depressed. When pressure is applied to the said finger piece, carriage 69 is lowered against the action of spring 86 and the bread racks 43 brought into toasting position. The case 91 is also provided at its opposite end wall with a stationary finger piece 99, similar to the finger piece 98, which finger pieces may be used for carrying the toaster about.

The timing mechanism 12 of my invention consists of a strip of bi-metal 101, shown in Figs. 1, 3 and 4, which is movable in the direction of its length and is guided for movement in the following manner: Issuing outwardly from the upright 77 of support 76 is a flange 102. This flange has secured to the lowermost end thereof a guide 103 which is attached to said flange through screws 104. This guide has a central opening 105 through which the bi-metal extends and is provided with ears 106 extending into said opening to restrain movement of the bi-metal out of the same. A button 107, formed on the guide 103 serves as a support for the bi-metal throughout its travel along the said guide. The strip of bi-metal 101 is further guided for movement in a similar guide 108 which is pivoted to the flange 102 of support 76. For this purpose, the said guide is constructed with two ears 109 which are journaled on a stub shaft 110 fast on the flange 102. A tension spring 111 is hooked at one end to a finger 112 on the guide 108 and at its other end on a pin 113 secured to the flange 102. This spring holds the guide 108 in its lowermost position, as shown in Fig. 3.

The strip of bi-metal 101 is constructed with a series of openings 114 arranged in spaced relation throughout the length thereof. These openings leave intervening portions 115 which form a rack indicated in its entirety by the reference numeral 116. Cooperating with the rack 116 is a segment of a pinion 117 which has teeth 118 adapted to mesh with the openings 114 of rack 116. This pinion segment is attached to a shaft 119 which is journaled in a bearing 121 secured to the flange 102. By means of this construction, the pinion segment 117 may rotate with relation to the rack 116, thereby controlling the movement of said rack. The pinion segment 117 has attached to it a small section 122 of a ratchet wheel, which is provided with ratchet teeth 123. This ratchet section is spaced from the pinion 117 and is secured thereto in concentric relation with reference to the teeth 118 by means of rivets 124. Pivoted on a stud 125 issuing outwardly from the flange 102 of support 76 is a detent 126 which has a catch 127 adapted to engage the various teeth 123 of the ratchet section 122. The detent 126 is provided with a finger 128 which rides along the upper surface of the strip of bi-metal 101 and to one side of the row of openings 114 therein. Finger 128 is held in engagement with the strip of bi-metal, by means of a tension coil spring 130 which is attached at one end to detent 126 and at its other end to a pin 140 issuing outwardly from the flange 102 of support 76. When the bi-metal bows upwardly, finger 128 is raised and the catch 127 of detent is disengaged from the particular tooth 123 of ratchet section 122 with which the same was engaged. Rotation of the pinion segment 117 in a clockwise direction is procured by means of a tension coil spring 129 which is hooked at one end to the bracket 82 and at its other end to a pin 131 issuing outwardly from the pinion 117. By means of this spring, movement of the strip of bi-metal 101 toward the left is procured, as shown in Fig. 3, when the detent 126 is successively disengaged from the ratchet teeth 123.

Operation of the detent 126 is caused by the heating of the strip of bi-metal 101 at a locality between the two guides 103 and 108. For this purpose, a hairpin heater 132 is employed which is attached to an insulating mounting 133, by means of two screws 134 and 135. The mounting 133 is attached to a lug 136 bent outwardly from the flange 102 of support 76 by means of screws 137. The mounting 133 is disposed outwardly of the said flange, as best shown in Figs. 2 and 4.

The carriage 69 is latched in its lowermost position by means of a latch 138. This latch is pivoted on a stud 150 secured to flange 102 of support 76. Said latch has a catch 139 which is adapted to engage a latch lug 141 attached to the carriage 69. The said latch 138 is constructed with a finger 142 which engages bearing 121 and limits movement of the catch 139 into latching position. A tension coil spring 143 secured at one end to the finger 142 and at its other end to a spring support 144, carried by the flange 102 urges the latch 138 into latching position. Mounted on the pinion segment 117 is a pin 145. When the last tooth of the teeth 132 of the ratchet section 122 has been released by the detent 126, spring 129 causes continued rotation of the pinion segment 117 and urges the pin 145 into engagement with the finger 142 of latch 138. This disengages the catch 139 from the latch lug 141 and frees the carriage which is raised to its uppermost position through the action of the spring 86.

For returning the pinion segment 117 to normal position, a cam 146 is employed which is pivoted on the shaft 119. This cam has a shoulder 147 which is adapted to engage the pin 145 on the pinion segment 117. The said cam also has a cam surface 148 which is adapted to be engaged by a roller 149, rotatably mounted on a stud 161 secured to a lug 152 issuing outwardly from the carriage 69. As the carriage 69 travels upwardly, said roller engages cam surface 148 and brings the shoulder 147 into engagement with pin 145, moving the pinion segment 117 in a counter-clockwise direction.

For controlling the energization of the heating elements 27, a switch, indicated in its entirety by the reference numeral 153, is employed. This switch utilizes the screw 134 holding heater 132 in place which screw is constructed with a contact head 154. A leaf spring switch arm 155 is attached to an insulating support 156 by means of a screw 157. This support, as best shown in Fig. 2, issues outwardly from and is made as a part of the base 21. The arm 155 has a contact 158 which is adapted to engage the contact 154. The end of the arm 155 is bent back to form an engaging portion 159 adapted to be engaged by an insulating button 261, attached to a bracket 262 extending outwardly from the carriage 69. When the carriage 69 is lowered, button 261 engages the engaging portion 159 of arm 155 and brings contact 158 into engagement with the contact 154 thereby closing the circuit through the switch 153.

Variations in the brownness of the toast toasted by the invention is procured by moving the movable guide 108 for the strip of bi-metal 101 in a manner to raise and lower the right hand portion of the bi-metal, as viewed in Figs. 3 and 2. This varies the amount of engagement of catch 127 of detent 126 with the teeth 123 of the ratchet section 122. It will readily be comprehended that, when this portion of the bi-metal is raised, less arching of the bi-metal will be necessary to disengage catch 127 from the tooth 123 with which it was engaged, thereby reducing the length of time necessary to release the detent from each tooth of the ratchet section 122 and vice versa. As shown in Fig. 2, the guide 108 is constructed with an arm 179 projecting outwardly therefrom. This arm has screwed in it an adjusting screw 181 which is adapted to engage the surface of a cam 182. Cam 182 is secured to a shaft 180 which projects outwardly through the case and has attached to it a knob 183 by means of which the same may be rotated. Shaft 180 is journaled for rotation in a hole drilled in the flange 102. Friction is afforded between the cam 182 and the flange 102 through a spring 185 which overlies the outer surface of said cam. This spring has an abutment 186 at its upper end which engages the flange 102. A rivet 187 passing through said spring and the flange 102 urges the lowermost end of the said spring into engagement with cam 182 and effects the desired result.

Manual release of the bread carriage 69 may be accomplished in the following manner: Pivoted to a lug 188 on flange 102 through a rivet 189 is a lever 191. This lever has a finger 192 extending through the case 91. A button 193, attached to the end of this finger permits of pressing the finger inwardly. Lever 191 is formed with an arm 194 extending through the flange 102 of support 76, which arm is adapted to engage the arm 179. When the button 193 is pressed inwardly, lever 191 is oscillated to depress arm 179. This raises the bi-metal guide 108 sufficiently to move the detent 126 out of engagement with the teeth 123 of ratchet section 122. The bi-metal is then permitted to travel from right to left, movement thereof being procured through the spring 129. When the pin 145, on the pinion segment 117 engages the finger 142 of latch 138, the bread carriage 69 is released and the bread racks 43 move to their uppermost position.

In order to cushion the action of the bread carriage in raising to its uppermost position, a dash pot 160 is employed. This dash pot comprises a cylinder 161 which is mounted on a mounting 162, secured to the flange 102 of support 76. Said dash pot further includes a piston 195 which has pivoted to it a connecting rod 163. Connecting rod 163 is in turn pivoted to a pin 164 fast on the pinion segment 117. Leakage in the dash pot 160 is procured by constructing the piston 195 sufficiently loose so that air may travel past the same at the desired rate to procure the cushioning effect sought.

Ventilation in the portion of the case 91 in which the timing mechanism is disposed, is controlled by the following construction. A plate 165 is employed which is disposed along the under side of the base 21 and which is attached thereto by means of screws 170. This plate has a flange 167 extending upwardly therefrom which is adapted to overlie the vertical frame member 16 of the frame 10. In the plate 165 are formed various openings 166 which control the entry of air into the portion of the case 91 in which the timing mechanism is disposed. The air entering this portion of the case escapes through openings 168 in the end frame member 16 and passes outwardly from the case 91 through the openings 96 in the top 93 thereof. The heater 132 is completely enclosed about the sides and from beneath the same by means of a housing 169 which is secured to the plate 165.

For the purpose of collecting the bread crumbs from the bread deposited in the toast ovens 28 and 29, a crumb pan 171 is employed which is disposed beneath the frame 10 and which is attached to the base 21 by means of studs 172 screwed to the lower frame member 14, and nuts 173 screwed upon the lower threaded ends of the same.

The compensating means 13 of the invention includes a resistor or resistance 200 which is constructed of a metal having the characteristic that the resistance of the same increases very rapidly with increase of temperature thereof. One such metal is iron, which to a marked degree increases in resistance upon increase in temperature. Another material which serves the purpose is an alloy consisting of approximately 70% of nickel and 30% of iron. The resistor 200 is constructed of wire and is wound to form two open coils 200$^a$ and 200$^b$. The wire is sufficiently heavy so that the coils become self-supporting when attached at their ends. Attached to the plate 16 of frame 10 near the lowermost portion thereof are four binding posts 203, 206, 216 and 217 which are insulated from the said plate 16. The binding posts 203 and 206 are disposed on one side of the plate and the binding posts 216 and 217 on the other side of the plate. One end of the coil 200$^a$ is clamped under the binding post 203, while the other end is clamped under the binding post 206. In a similar manner, one end of coil 200$^b$ is clamped under the binding post 216, while the other end is clamped under the binding post 217. Both the coils 200$^a$ and 200$^b$ are free from the frame 10 of the toaster and are situated above the plate 165. The two coils 200$^a$ and 200$^b$ are connected in series by means of a conductor 218 which is connected to the two binding posts 206 and 216. In addition to the resistor 200, a resistance 204 is employed which has a relatively low temperature coefficient of resistance, as compared to that of the resistor 200. A material such as that used for the heating coils 31 which consists of an alloy comprising approximately 80% nickel and 20% chromium is suitable. The resistance 204 is also constructed of sufficiently heavy wire so that the same may be formed in an open coil which is disposed on the opposite side of the end plate 16 from that on which the resistor 200 is disposed. The resistance 204 is arranged vertically, one end thereof being connected under the binding post 203 and the other end thereof being connected under another binding post 205 also attached to the end plate 16 and insulated therefrom. Resistance 204 is mounted on the same side of the frame member 16 as is the bread oven, so that the heat given off by resistance 204 does not cause overheating of the moving parts which constitute the timing mechanism. Suitable openings 219 in the plate 165 provide sufficient draft for cooling the resistor 200 the desired amount.

In Fig. 5, which is a wiring diagram of the invention, the heating elements 27 are all shown as connected in parallel to two conductors 207 and 208. The conductor 207 is connected to one side of a line 209—210 for supplying electrical energy to the toaster. The resistor 200 is connected by means of a conductor 211 with the conductor 208, and is further connected by a conductor 217, with the heater 132. Heater 132 is connected by means of a conductor 213 to the switch 153, which, in turn, is connected to the other side 210 of the line. This forms the main circuit of the toaster. The resistance 204 is connected by means of a conductor 214 to conductor 211 and is further connected by means of a conductor 215 to the conductor 213. It will become evident that the resistor 200 and heater 132 are connected in series and that the resistance 204 shunts the circuit containing the said heater and resistor, thus forming a by-pass about the same. It will be further noted that the said heater, resistor and resistance are connected as a unit in series with the heating elements 27 which form the heating means of the toaster and which elements are themselves connected in multiple.

I have found that, where the toaster draws approximately 1100 watts, the resistor 200 would operate satisfactorily, if constructed of iron wire, with a diameter of .020 inch and a length of approximately 12 inches. To cooperate with a resistor of such dimensions, the resistance 204, if constructed of nickel-chromium wire, would have a diameter of .032 inch and a length sufficient to give 1.5 ohms resistance. If the alloy, previously referred to, were used for resistor 200, a wire having a diameter of .028 inch and a length of 20 inches would be used. In the toaster above described, the heater 132 is preferably constructed of nickel-chromium sheet material which is stamped as shown in Fig. 4. This heater may be constructed of sheet material of a thickness .0035 inch and of a suitable length to give a resistance of .55 ohm.

Applicant has found that the values above designated operate satisfactorily to produce uniform toasting in a device of the character described within the limits of 100 to 120 volts. While the above noted values have been found satisfactory it can also be readily comprehended that the same may be varied within reasonable limits and satisfactory results procured.

The operation of my invention is as follows: With a toaster constructed in accordance with my application for patent above referred to, increase in line voltage produces an excessive decrease in the timing period and a corresponding decrease of brownness of the toast with the same adjustment of the toaster. This may best be explained as follows: The increase in energy consumed by the heater 132 varies as the square of the voltage while the losses due to radiation of heat from the heater remain fairly constant, the heater being thermally isolated from the heating means of the toaster used for toasting the bread by means of housing 169. Thus the percentage of increase in heat transmitted by the heater 132 to the bi-metal 116 is far in excess of the percentage of rise in voltage and the timing mechanism 12 which depends for operation upon the heat imparted to the bi-metal 116 operates more rapidly and the timing cycle is reduced beyond that necessary to compensate for the added energy supplied to the heating means 31. An increase in the voltage across the line 209—210 in the instant invention would cause a corresponding increase across the resistor 200 and the heater 132. This would likewise cause an increase in voltage across the resistance 204. The ratio between the resistance of the resistor 200 and resistance 204 would, however, be disturbed since the specific resistance of the resistor 200 increases upon increase in temperature. Such increase in the resistance of the resistor 200 would change the proportion of the current flowing through the said resistor and resistance 204, so that, upon increase in voltage, the percentage of increase of the current through the resistor 200 becomes less. At the same time, the rate of change of current through the heater 132 becomes less, it being connected in series with resistor 200, so that variation in current through this heater does not vary as would be the case with the resistor 200 omitted, but becomes less. This has the effect of reducing the maximum temperature of the heater 132, so that it takes longer to heat up the strip of bi-metal 101. Accordingly, the timing period is increased and compensation for the excessive decrease in timing period produced by high voltage is procured.

In actual tests on a toaster constructed in accordance with my invention, the following measurements were taken. With a line voltage of 100 volts, the voltage drop across the resistance 204 was 5.7 volts, and across the resistor 200 and the heater 132 were 2.6 volts and 3.1 volts, respectively. Upon a 10% increase in the line voltage, the drop across the resistance 204 became 6.7 volts, showing an increase of 17½%. This increase in percentage of voltage drop is due to the increase in specific resistance of the resistor 200. This voltage drop divided itself between the resistor 200 and the heater 132 in proportion to their resistances which gave a voltage drop of 3.45 volts across resistor 200, and 3.25 volts across heater 132. It will thus be readily comprehended that the drop across heater 132 at 110 volts is greater than the drop across the resistor 200 at the same voltage, whereas the reverse was true at a line voltage of 100 volts. This represents an increase of .15 volt over the original voltage drop of 3.1 volts of heater 132, which amounts to 4.8%, as contrasted to the 10% increase in line voltage. When the line voltage was increased 20%, the drop across the resistor 204 measured 7.7 volts, which drop became divided between the resistor 200 and the heater 132 in the proportion 4.35 volts and 3.35 volts. This represents an increase of .25 volt over the original 3.1 volts across the heater 132 resulting in an 8% increase in line voltage. The result is that the disadvantages of the structure shown in my copending application for patent may be corrected by selecting the proper values of the resistances of the resistor 200 and the resistance 204, so that uniform brownness of toast can be procured for all voltages within feasible limits. It will thus be readily comprehended that the rate of increase of current through heater 132 is not proportional to the rate of increase of the line voltage but decreases sufficiently to permit of compensating for the excessive reduction in the rate of decrease of the timing period produced by increasing voltage.

The advantages of my invention are manifest. My improved toaster is fully automatic and automatically compensates for variations in voltage. My invention does not require any moving parts for procuring compensation and is not subject to wear or deterioration. The compensating feature of my invention may be incorporated in the toaster proper at a nominal expense. For any particular kind of bread, duplications of the brownness of the toast may be procured without re-adjustment of the toaster regardless of voltage.

Changes in the specific form of my invention, as herein disclosed, may be made within the scope of what is claimed without departing from the spirit of my invention.

Having described my invention, what I claim as new and desire to protect by Letters Patent is:

1. In a periodically operated cooking device, electrical heating means, a timing mechanism including a thermally responsive member, an electric heater therefor, a circuit for connection to a source of electrical energy, a resistor having a high temperature co-efficient of resistance as compared to that of the heating means, said heating means, heater and resistor being connected in series in said circuit, means operated by said thermally responsive member for deenergizing said heating means and heater to terminate the cooking period, a resistance shunting said resistor and heater and having a temperature co-efficient differing from that of said resistor, said heating means, resistor, heater and resistance being all energized continuously during the cooking cycle, said resistor operating upon variation of the voltage of the source of electrical energy to vary the proportion of the current through said resistance and through said heater, thereby varying the timing period to procure uniform toasting regardless of variation in voltage.

2. In a periodically operated cooking device, electrical heating means, a timing mechanism including a thermally responsive member, an electric heater therefor, a main circuit for connection to a source of electrical energy, a resistor having a high temperature coefficient of resistance as compared to that of the heating means, said heating means, heater and resistor being connected in series in said main circuit, a by-pass circuit by-passing said heater and resistor, a resistance in said by-pass circuit, said heating means, heater, resistor and resistance being all energized continuously during the cooking cycle, means operated by said thermally responsive member for deenergizing said heating means and heater to terminate the cooking period, said resistor operating upon variation of the voltage of the source of electrical energy to vary the proportion of the current through said resistance and through said heater thereby varying the timing period to procure uniform toasting regardless of variation in voltage.

3. In a periodically operated cooking device, electrical heating means, a timing mechanism including a thermally responsive member, an electric heater therefor, a circuit for connection to a source of electrical energy, a resistor having a high temperature coefficient of resistance as compared to that of the heating means, said heating means, heater and resistor being connected in series in said circuit, a resistance shunting said resistor and heater and having a temperature coefficient differing from that of said resistor, said heating means, resistor, heater and resistance being all energized continuously during the cooking cycle, means operated by said thermally responsive member for deenergizing said heating means and heater to terminate the cooking period, said resistor and resistance having values such that the rate of increase of current through said heater is less than the rate of increase of the voltage at the source.

4. In a periodically operated cooking device, electrical heating means, a timing mechanism including a thermally responsive member, an electric heater therefor constructed of nickel chromium material having a resistance of approximately .55 ohms, a circuit for connection to a source of electrical energy having a voltage of between 100 volts and 120 volts, a resistor constructed of a length of wire of about .028 inches in diameter and about 20 inches long and formed of a material composed of about 70% nickel and 30% iron, said heating means, resistor and heater being connected in series in said circuit, means operated by said thermally responsive member for deenergizing said heating means and heater to terminate the cooking period, a resistance constructed of a length of nickel-chromium wire of a diameter of about .032 inches and having a resistance of about 1.5 ohms and shunting said resistor and heater, said heating means, resistor, heater and resistance all being energized continuously during the cooking cycle.

5. In a periodically operated cooking device, electrical heating means, a timing mechanism including a thermally responsive member, an electric heater therefor, a circuit for connection to a source of electrical energy, a resistor having a high temperature coefficient of resistance as compared to that of the heating means, said heating means, heater and resistor being connected in series in said circuit, means operated by said thermally responsive member for deenergizing said heating means and heater to terminate the cooking period, a resistance shunting said resistor and heater and having a temperature coefficient differing from that of said resistor; said heating means, resistor, heater and resistance being all energized continuously during the cooking cycle, said resistor and resistance having values such that the rate of increase of current through said heater differs from the rate of increase of the voltage at the source.

6. In a periodically operated cooking device, electrical heating means, a timing mechanism including a thermally responsive member, an electric heater therefor, a circuit for connection to a source of electrical energy, a resistor having a high temperature coefficient of resistance as compared to that of the heating means, said heating means, heater and resistor being connected in series in said circuit, means operated by said thermally responsive member for terminating the cooking period, a resistance shunting said resistor and heater and having a temperature coefficient differing from that of said resistor, said resistor and resistance being energized continuously during the energization of the heater, said resistor operating upon variation of the voltage of the source of electrical energy to vary the proportion of the current flowing through said resistance and through said heater, thereby varying the timing period to procure uniform toasting regardless of variation in voltage.

7. In a periodically operated cooking device, electrical heating means, a timing mechanism including a thermally responsive member, an electric heater therefor, a circuit for connection to a source of electrical energy, a resistance, said heating means, heater and resistance being connected in series in said circuit, means operated by said thermally responsive member for terminating the cooking period, a second resistance shunting said first resistance and heater, one of said resistances having a high temperature coefficient of resistance as compared to the other resistance and operating upon variation in voltage to vary the proportion of the current flowing through the heater and through the second resistance to vary the timing period thereby varying the timing period to procure uniform toasting regardless of variation in voltage.

8. In a periodically operated cooking device, electrical heating means, a timing mechanism including a thermally responsive member, an electric heater therefor, a circuit for connection to a source of electrical energy, a resistance, said heating means, heater and resistance being connected in series in said circuit, means operated by said thermally responsive member for terminating the cooking period, a second resistance shunting said first resistance and heater, said resistances being energized continuously during the energization of said heater, one of said resistances having a high temperature coefficient of resistance as compared to the other resistance and operating upon variation in voltage to vary the proportion of the current flowing through the heater and through the second resistance to vary the timing period thereby varying the timing period to procure uniform toasting regardless of variation in voltage.

ROBERT SARDESON.